US012413578B1

(12) United States Patent
Phan

(10) Patent No.: US 12,413,578 B1
(45) Date of Patent: Sep. 9, 2025

(54) PASSWORDLESS AUTHENTICATION ACROSS MULTIPLE LAYERS AND MULTIPLE DIRECTORY SERVICES

(71) Applicant: Xage Security, Inc., Palo Alto, CA (US)

(72) Inventor: Thuy Van Phan, Sunnyvale, CA (US)

(73) Assignee: Xage Security, Inc., Palo Alto, CA (US)

( * ) Notice: Subject to any disclaimer, the term of this patent is extended or adjusted under 35 U.S.C. 154(b) by 309 days.

(21) Appl. No.: 18/446,194

(22) Filed: Aug. 8, 2023

(51) Int. Cl.
*H04L 9/40* (2022.01)
*G06F 16/27* (2019.01)

(52) U.S. Cl.
CPC ............ *H04L 63/083* (2013.01); *G06F 16/27* (2019.01); *H04L 63/0876* (2013.01)

(58) Field of Classification Search
CPC .... H04L 63/083; H04L 63/0876; G06F 16/27
See application file for complete search history.

(56) References Cited

U.S. PATENT DOCUMENTS

| | | | | |
|---|---|---|---|---|
| 10,135,835 | B1 * | 11/2018 | Kandel | H04L 63/0876 |
| 10,671,712 | B1 * | 6/2020 | Lindley | H04L 63/0861 |
| 11,836,791 | B2 * | 12/2023 | Simpson | G06Q 30/0607 |
| 12,375,367 | B2 * | 7/2025 | Woan | H04L 12/4641 |
| 2018/0270065 | A1 * | 9/2018 | Brown | H04L 63/08 |
| 2019/0324958 | A1 * | 10/2019 | Ow | G06F 16/27 |
| 2020/0076606 | A1 * | 3/2020 | Burke | H04L 63/0884 |
| 2021/0056227 | A1 * | 2/2021 | Xu | G06F 21/64 |
| 2021/0374724 | A1 * | 12/2021 | Karaoglu | G06Q 20/389 |
| 2022/0394026 | A1 * | 12/2022 | Liu | H04L 63/083 |
| 2024/0005316 | A1 * | 1/2024 | Doney | G06Q 20/36 |
| 2024/0405980 | A1 * | 12/2024 | Chang | H04L 9/3247 |

FOREIGN PATENT DOCUMENTS

| | | | |
|---|---|---|---|
| CN | 117318931 A | * 12/2023 | ........... H04L 9/0877 |
| WO | WO-2022111838 A1 | * 6/2022 | ........... H04L 9/3239 |

\* cited by examiner

*Primary Examiner* — Richard G Keehn
(74) *Attorney, Agent, or Firm* — Baker Botts L.L.P.

(57) ABSTRACT

In one embodiment, a method includes receiving a first request to access one or more resources in the first network layer. The method may include acquiring first identity information of a first user account specified in the first request. The method may include performing multi-factor authentication of the first user account using the first identity information. In response to authenticating the first user account using the first identity information, the method may include acquiring multiple shares of pre-configured first hidden data from a distributed ledger in the first network layer. The method may include determining a first password from the multiple shares of pre-configured first hidden data and, using the first password, authenticating the first user account to access the one or more resources in the first network layer.

24 Claims, 9 Drawing Sheets

PASSWORDLESS AUTHENTICATION ACROSS MULTIPLE LAYERS AND MULTIPLE DIRECTORY SERVICES

TECHNICAL FIELD

One technical field of the present disclosure is network security in the field of operational technology (OT) and/or Internet of Things (IoT) environments. Another technical field is computer-implemented passwordless authentication across multiple network layers in computing environments with a multi-layer topology.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Software systems are particularly susceptible to data exfiltration, identity theft, and fraud, whereby a malicious entity gains access to protected data and assets. Cybersecurity infrastructure is critical for identifying, tracing, and analyzing each critical component or service that is incorporated into various systems. These problems can be acute in certain high-risk systems, such as transportation systems, supply chain operations, energy systems, water supply operations, and utilities.

Operational technology (OT) and industrial control systems (ICS) environments frequently lack built-in security controls, connect using multiple networks, and require remote access to physical assets via internetworking connections that are coupled to the public internet. Successful infiltration can result in shutdowns, reputational harm, environmental damage, and even loss of lives. Securing modern software systems in these environments is a formidable task, largely because a cybersecurity software application must assess cybersecurity threats in all stages of the software supply chain.

Operational requirements can complicate security screening. For example, some enterprises need to create multiple user identities for the same human user across multiple Active Directory (AD) servers or domains to grant the user access to different security zones and corresponding information technology (IT) assets or OT assets or devices within an IT network and an OT network. The same human user might have many user accounts, each with its own password, needed to access different resources across a multi-layer computing environment. This makes such enterprises complex for the human user to access. To reduce the effect of this complexity, human users will often choose similar or even the same password for multiple accounts if they have many accounts needed to access sensitive resources, thus reducing the security of resources across multiple layers. In addition, users input passwords "across the wire" (e.g., from a user device to the multi-layer network) to access their accounts, making the passwords susceptible to replay attacks.

Multiple user identities also add management complexity; for example, when the human user changes status, such as by leaving the enterprise or due to the expiration of a contract, then each user identity must be deleted from a corresponding AD. The result can be stale accounts that continue to exist in the ADs long after the user has departed.

The Purdue model, part of the Purdue Enterprise Reference Architecture (PERA), was designed as a reference model for data flows in computer-integrated manufacturing (CIM), where a plant's processes are completely automated. It came to define the standard for building an ICS network architecture in a way that supports OT security, separating the layers of the network to maintain a hierarchical flow of data between them. The model shows how the typical elements of an ICS architecture interconnect, dividing them into six zones that contain information technology (IT) and OT systems. In the Purdue Model, communications are designed to transit zones upward or downward one zone at a time and not across multiple zones. Implemented correctly, it helps establish an "air gap" between ICS/OT and IT systems, isolating them so an organization can enforce effective access controls without hindering business. Yet new approaches are needed to cope with the complexity of managing user access within computing environments having a multi-layer architecture since security holes typically are opened using firewalls across various layers, static accounts exist on jump boxes, human users input their passwords across the wire, and human users may rely on repeat passwords across multiple layers.

SUMMARY

The appended claims may serve as a summary of the invention.

DETAILED DESCRIPTION

Figure 1:
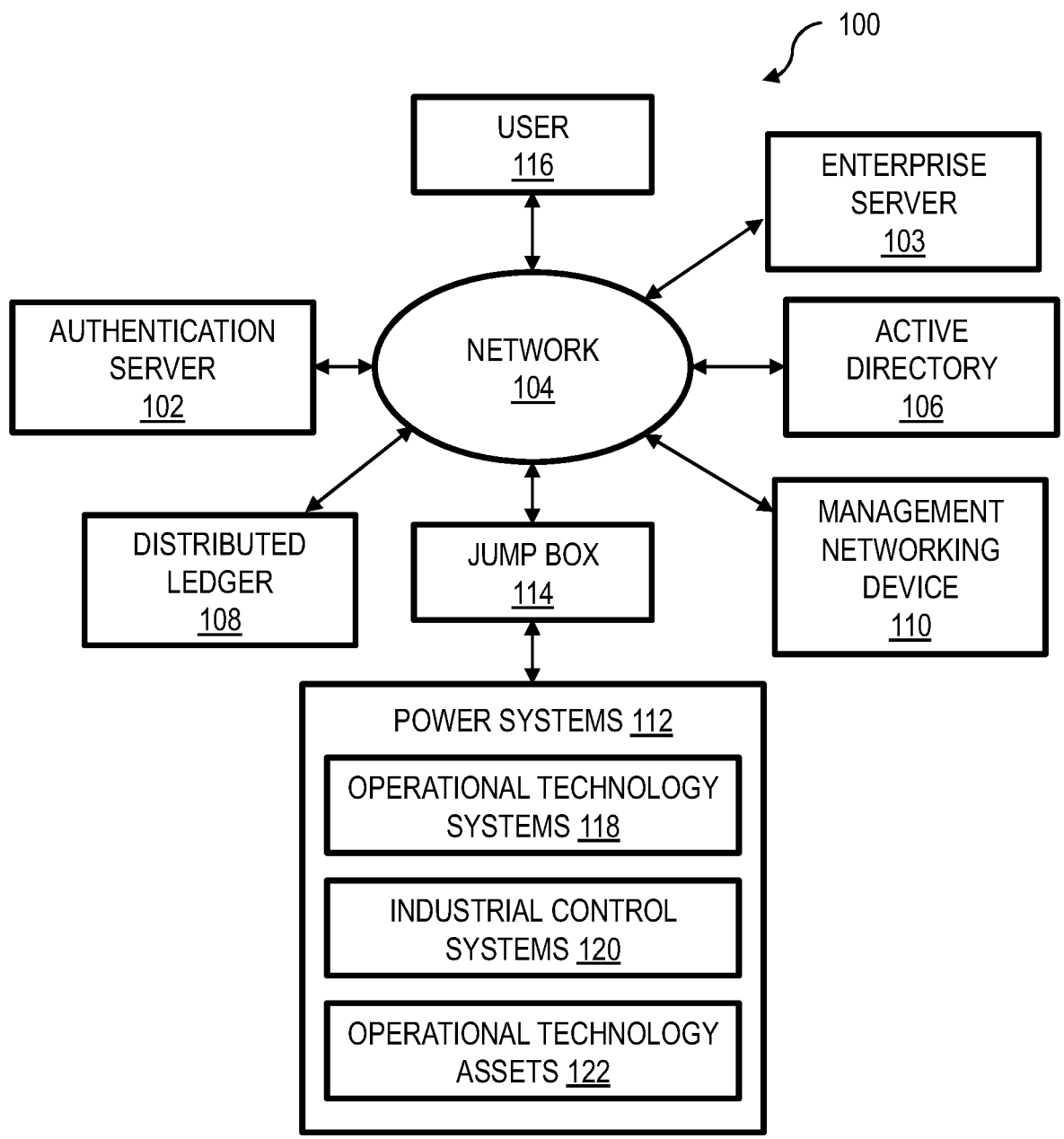
FIG. 1 shows a distributed computer system using an authentication server in accordance with an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate various possible embodiments and to illustrate one or more aspects of the inventions more fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted In an embodiment or some occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Cybersecurity leaders have begun to rely on multi-factor authentication to implement secure critical operational technology and industrial control systems. In an inventive moment, the inventors have discovered that improved security can be achieved by supplementing a cybersecurity architecture to combine multi-factor authentication with pre-configured hidden data secured in distributed ledgers to provide passwordless authentication of user accounts across multiple network layers.

In an embodiment, a computer-implemented method is programmed to implement multi-layer passwordless authentication of user accounts to access a plurality of operational technology systems of a computing environment. The method can be executed in a computing environment having a multi-layer network topology consisting of at least an IT network layer and an OT network layer, optionally having multiple zones, and optionally having a cloud layer logically above the IT network layer. When a user account attempts to access any of a plurality of operational technology systems of the protected environment, the method is programmed to implement a passwordless authentication to grant access to a sensitive data resource based on verified identities and, typically, to require passwordless authentication of a request, user account, or user whenever the request, user account, or user traverses the topology to a different layer or zone. In an embodiment, the method is programmed to receive a request for access to a sensitive data resource, perform multi-factor authentication of a user account using identity information provided in the request, and acquire from a distributed ledger multiple shares of hidden data that are assembled into a password for authenticating the user account to access the sensitive data resource. Examples of sensitive data resources can include protected programs, endpoints, servers, data, assets, devices, and/or systems needed for tasks.

The method enables a human user associated with multiple user accounts, using multi-factor authentication, to traverse multiple network layers without having to remember multiple passwords and without inputting passwords across the wire. In addition, the method allows a user to traverse multiple layers without re-authentication at each network layer. For example, once a user account is authenticated using passwordless authentication in a first network layer, the method allows the user account to send a request to access resources in a second network layer seamlessly without re-authenticating the request at the first network layer.

2. Structural and Functional Overview

2.1 Distributed Computer System

FIG. 1 illustrates a distributed computer system showing the context of use and principal functional elements with which one embodiment could be implemented. In an embodiment, a computer system 100 comprises components that are implemented in an informational technology (IT) network layer and/or a demilitarized zone (DMZ) network layer at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of managing passwords for multiple user accounts requesting access to sensitive data sources across multiple network layers in multi-layer computing environments. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 1 shows a computer system 100 comprising an authentication server 102 and an enterprise server 103 that are each communicatively coupled to a network 104, an active directory 106 that is accessible via the network 104, a distributed ledger 108 that is accessible via the network 104, a management networking device 110 that is accessible via the network 104, and power systems 112 that are communicatively coupled via a jump box 114 to the network 104, in accordance with one or more embodiments. In various embodiments, the components and arrangement of the computer system 100 can vary; while FIG. 1 shows one configuration of components, and other configurations may be used without departing from the scope of the disclosure. For example, multiple components in FIG. 1 may be combined to create a single component. As another example, the functionality performed by a single component may be performed by two or more components, or multiple instances of certain components can be provided. For example, when the authentication server 102 is implemented using a Xage Fabric node from Xage Security, Inc., many Xage Fabric nodes each acting as a point of authentication and authorization, can be deployed in various layers or zones, alone or with Xage Enforcement Points (XEPs). Additionally or alternatively, one or more Active Directory (AD) nodes, AD servers, or other directory servers or authentication servers can provide authentication services within a particular layer or zone.

In the example of FIG. 1, the computer system 100 is configured for performing authentication for a user computer, user account, client computer, or other computing device or technical element that requests access to the system generally or to the power systems 112. For simplicity, the designation "user 116" refers to one or more computing devices such as a user computer, user account, client computer, or other computing device or technical element that requests access to the system, but the label "user" refers exclusively to technical elements that interact programmatically or electronically with other elements, and not individual persons.

The authentication server 102 may be implemented using any one or more of a server computer, desktop computer, and/or one or more virtual computing instances in one or more private data centers and/or public data centers or cloud computing environments. The authentication server can be programmed to communicate with other functional elements using TCP/IP as well as application-layer protocols such as parameterized HTTP or to communicate programmatically via API calls, RPC, or other programmatic messaging.

The network 104 broadly represents any wireline or wireless network using any form of electronic digital communication link, including satellite or terrestrial network links, such as cloud, local area networks (LANs), metropolitan area networks (MANs), wide area networks (WANs), campus network, internetworks, or combinations thereof. The network 104 may include or comprise the public internet and networked server computers that implement Web2 and/or Web3 technologies. The network 104 may comprise or support intranets, extranets, or virtual private networks (VPNs).

In an embodiment, the authentication server 102 may implement network security features using multiple programs, sets of executable instructions, programmatic services, or other functional elements to provide access to the active directory 106 and/or power systems 112 and secure power systems 112 against cyber-attacks. For example, the authentication server 102 may implement specific programmatic rules that identify what IP addresses, ports, requests, or messages are allowed and/or disallowed for communicating with and controlling resources in the computer system 100, such as the active directory 106, firewall and jump box 114, and/or the power systems 112. The authentication server 102 can read and execute authentication instructions providing passwordless authentication of users to reduce complexity in executing admission or blocking operations on network traffic.

In an embodiment, power systems 112 broadly represents one or more computing devices, network infrastructure, IoT elements, or electromechanical devices of operational technology (OT) systems 118, industrial control systems (ICS) 120, and operational technology assets 122. The operational technology systems 118 can include one or more networks to monitor and control different operational technology assets 122 of the power systems 112, and those networks can be regarded as critical infrastructure. Power systems 112 can comprise large-scale, distributed systems, and consequently, the critical infrastructure can be a prime target for cyber-attacks from one or more malicious actors, especially when the critical architecture is exposed to IT zones where the cyber-attacks are located. For example, if critical infrastructure is compromised, cyber-attacks can cause infiltration, power shortages, and widespread disruption. The label "power systems 112" is used as an example to represent power generation assets such as turbines and related control systems, as well as protected systems unrelated to power, such as utility systems, transportation systems, logistics systems, or government systems, as a few examples.

In an embodiment, the industrial control systems 120 may include one or more hardware-based electronic control systems, such as Programmable Logic Controllers (PLCs), remote sensors, servos, pumps, and/or control valves. In an embodiment, the industrial control systems 120 can have sizes ranging from modular panel-mounted controllers to large interconnected and interactive distributed controlled systems to assess business operational data, IT operational data, or combinations thereof, such as transaction invoices, performance indicators, capacity, temperature, pressure, and flow, at multiple setpoints.

In an embodiment, to protect power systems 112, the computer system 100 implements network security using multiple functional elements at multiple different logical layers, such as the authentication server 102 and firewall/jump box 114, to block or limit access to resources or data that are physically or logically outside or behind the firewall/jump box 114. For example, all digital network traffic of the user 116, or any other computing device attempting to access the power systems 112, may be routed through the firewall/jump box 114 to access the power systems.

2.2 Authentication Server

The authentication server 102 is programmed to enforce one or more security models, such as a multi-factor authentication (MFA) model, and/or cybersecurity policies concerning the treatment of network traffic directed toward resources in one or more network layers. The authentication server 102 can be programmed to authenticate and authorize access requests according to a security policy and/or using one or more security models. For example, the authentication server 102 can be programmed to execute multi-factor authentication and password unveiling at each network layer to minimize the risk of compromised identities.

In an embodiment, the authentication server 102 may be programmed to receive a resource access request from a user 116 and, in response to acquiring identity information, such as user credentials in the resource access request, to perform a multi-factor authentication using the identity information and the one or more security models. The identity information can comprise a username and a one-time password for a remote access session which is time-bound, scheduled, and short-lived. In other embodiments, the identity information can comprise a username and another type of multi-factor authentication password or technique such as a text message, hardware token, smart card, etc.

In response to authenticating the user account, the authentication server 102 can be programmed to acquire multiple shares of pre-configured hidden data from the distributed ledger 108, determine a password from the multiple shares of pre-configured hidden data, and authenticate the user to access one or more resources using the unveiled password. If the multi-factor authentication fails, the authentication server 102 can be programmed to reject the user or user account.

Figure 2:
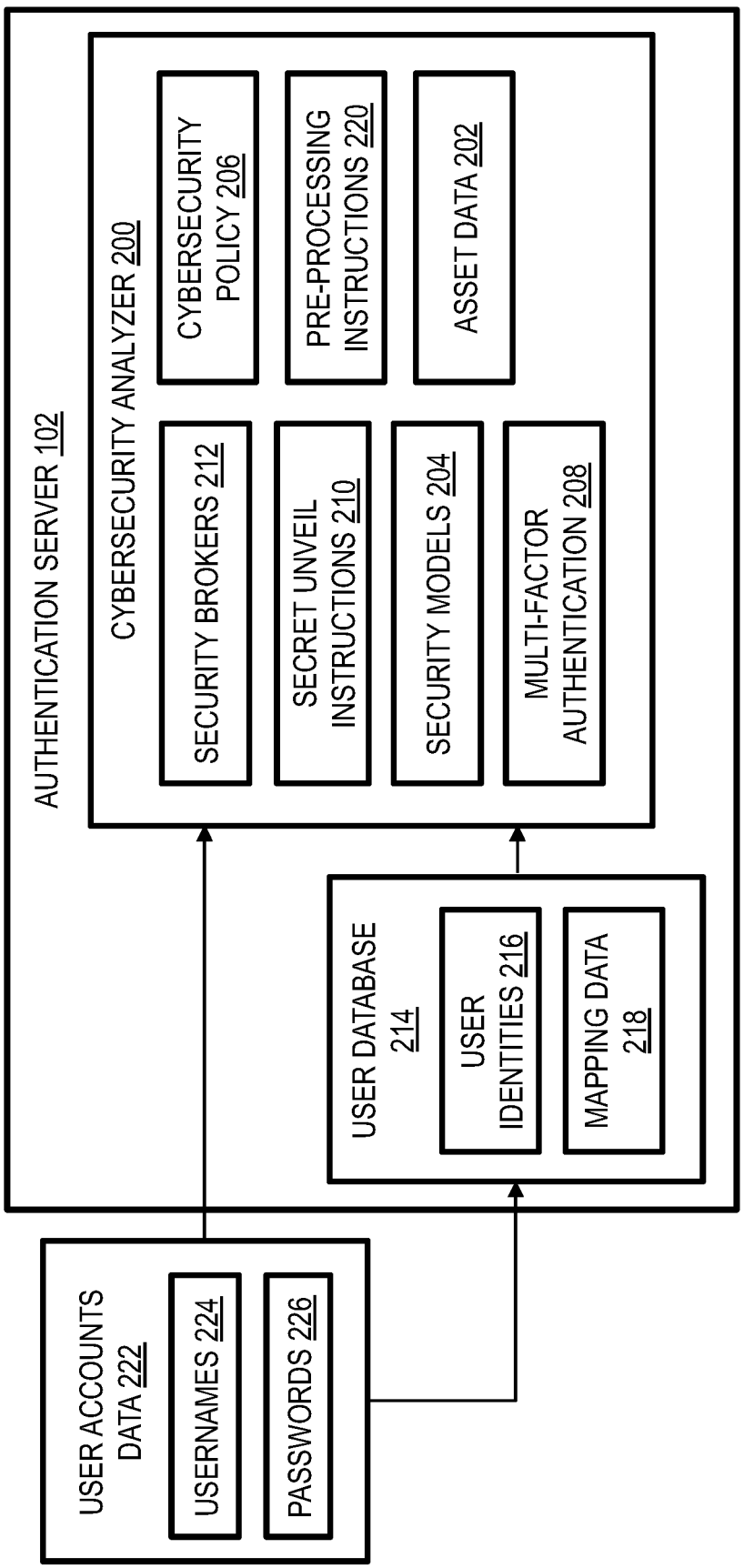
FIG. 2 shows an example authentication server that receives user account data in accordance with an example embodiment.

FIG. 2 illustrates an example of functional elements and data sources of an authentication server 102. In an embodiment, the authentication server 102 is programmed to perform user authentication using a cybersecurity analyzer 200. Assume that a user (e.g., 116 of FIG. 1) attempts to access a particular sensitive data source, such as asset data 202, using an electronic device via an enterprise server (e.g., 103 of FIG. 1), the enterprise server can be programmed to transmit a request to the authentication server 102 to perform user authentication using one or more security models 204. The electronic device may include a mobile phone, a tablet computer, or a laptop computer. The user (e.g., 116 of FIG. 1) can use the electronic device to submit identity information, such as a username and a time-based one-time password (TOTP).

In an embodiment, the cybersecurity analyzer 200 can be programmed to implement a cybersecurity policy 206 to grant access to a sensitive data resource, such as asset data 202. The sensitive data resource can include sensitive information associated with account information, personal information, or software code. For example, sensitive information is text, an image, a video, or a directory. The cybersecurity analyzer 200 can be programmed to implement cybersecurity policy 206 to ensure system-level user safety across multiple components of the computer system (e.g., 100 of FIG. 1). In particular, cybersecurity analyzer 200 can be programmed to use cybersecurity policy 206 continuously to detect cyber-attacks from one or more malicious actors from an endpoint device like user (e.g., 116 of FIG. 1) attempting to access the sensitive data resource in a cloud-based application hosted by the computer system. For example, cybersecurity policy 206 can be programmed to include predetermined cybersecurity requirements and instructions for user authentication and detection of cyber-attacks in the computer system. In an example, cybersecurity policy 206 can include a plurality of actions to authenticate a user to access a particular sensitive data resource. Therefore, the cybersecurity analyzer 200 can be programmed to implement cybersecurity policy 206 to control access to the sensitive data resource based on the predetermined cybersecurity requirements and instructions.

In an embodiment, the cybersecurity analyzer 200 may be programmed to execute multi-factor authentication 208 to minimize the risk of compromised identities. The multi-factor authentication 208 can be programmed to execute authentication of the identity information (e.g., authenticating the username based on the TOTP) to uniquely identify a user.

In addition, the cybersecurity analyzer 200 may be programmed with secret unveil instructions 210 for unveiling a password used to authenticate the user to access one or more resources in a network layer or zone. The password may be unveiled from multiple shares of pre-configured hidden data located within nodes of a distributed ledger (e.g., 108 of FIG. 1) in the network layer at which access is being requested. Upon unveiling the password, the authentication server 102 may authenticate the user to access one or more resources using the unveiled password. The cybersecurity analyzer 200 may include one or more security brokers 212 used to pre-configure and distribute the hidden data into various security nodes within the distributed ledger prior to the access request.

As described below, requests that transit multiple layers or zones are required to complete a new passwordless authentication (e.g., using a new username, a new TOTP, and a new unveiled password) in the new layer or zone. However, such requests that transit layers or zones are not required to complete re-authentication at the original layer or zone. Thus, access requests can move seamlessly among layers without re-authentication.

In an embodiment, the authentication server 102 may further include a user database 214 that maintains a list of user identities 216 (e.g., usernames) that are allowed to access one or more resources (e.g., asset data 202) in the multi-layer computing environment. The user database 214 also comprises mapping data 218 associated with each of the user identities 216 mapping each user identity to a corresponding access point. For example, a first user identity associated with a particular user may be used to access one or more resources in a first network layer, and a second user identity associated with the same user may be used to access one or more resources in a second network layer. As such, the authentication server 102 maintains a mapping of all user accounts in the user database 214. In database 214, the authentication server 102 may maintain a mapping of each user (e.g., human user, user device, etc.) and all their related accounts (e.g., user accounts for accessing different network layers or zones). This database 214 may be separate from any active directories (e.g., 106 of FIG. 1) and their administrator(s).

In an embodiment, the cybersecurity analyzer 200 can be programmed with pre-processing instructions 220 to verify the user based on verifying the identity information submitted with the access request. For example, the pre-processing instructions 220 can be programmed to access the user database 214 and to determine whether the username submitted with the access request matches a username that is active in the user database 214. In response to determining a match, the pre-processing instructions 220 can be programmed to verify the user. Upon verifying the user, the cybersecurity analyzer 200 may execute the multi-factor authentication 208 described above. As discussed above, upon confirming the user identity via the multi-factor authentication 208, the cybersecurity analyzer 200 may execute the secret unveil instructions 210 to provide access to one or more resources.

A management networking device (e.g., 110 of FIG. 1) may be communicatively coupled to the authentication server 102 and may provide user accounts data 222 for one or more network layers of the multi-layer computing environment to the authentication server 102. In an embodiment, the user accounts data 222 includes usernames 224 and passwords 226 corresponding to the usernames 224 for authenticating the user to access one or more resources in the multi-layer computing environment. The management networking device, which may be present in a network layer of the computing environment, can access identity awareness data (e.g., user accounts data 222) that are authorized to access an active directory (e.g., 106 of FIG. 1). The user database 214 may receive usernames 224 from the management networking device and store those as user identities 216. The security brokers 212 may receive the passwords 226 from the management networking device to configure and distribute hidden data to multiple nodes in the distributed ledger (e.g., 108 of FIG. 1).

The management networking device (e.g., 110 of FIG. 1), the authentication server 102, another computing system, or a combination thereof may determine a new user account is present in the accounts data 222 accessed by the management networking device. In an embodiment, the management networking device (e.g., 110 of FIG. 1) may send new accounts data 222 to the authentication server 102 whenever an administrator creates one or more new user accounts in one or more active directories (e.g., 106 of FIG. 1) of the system. The administrator may register a username 224 and an initial password 226 for each new user account that is created, and each username 224 and initial password 226 is provided as new user accounts data 222 to the authentication server 102. Registration may comprise transmitting a request to register a new user account to access resources of the computing environment. The authentication server 102 may acquire the new accounts data 222, and the security brokers 212 may receive the new password(s) 226 for the new account(s) and configure and distribute new hidden data to multiple nodes in the distributed ledger to hide the password(s) 226, as discussed above. In an embodiment, the authentication server 102 may change a password 226 corresponding to a particular username 224 after each attempt to authenticate the corresponding user account to access one or more resources.

With the new accounts data 222, the management networking device (e.g., 110 of FIG. 1) may send a request to the authentication server 102 to register a new user account to access one or more resources in the computing environment. In response to the request, the authentication server 102 may update the user database 214 to register one or more identities 216 (i.e., usernames) associated with the new user account(s) in the user database 214. The authentication server 102 may similarly update the user database 214 to include mapping data 218 mapping each new user identity 216 to a corresponding access point for the user account.

The authentication server 102 can be programmed to automatically update the user database 214 when one or more user accounts are suspended from the computing system. For example, the authentication server 102 may receive a request to suspend one or more user accounts associated with particular user identity data from accessing resources of the computing environment. In response to the request, the authentication server 102 may update the user database 214 to suspend all identities (i.e., usernames) associated with the suspended user accounts from the database 214. This may be particularly beneficial for updating the user database 214 when a human user changes status, such as by leaving the enterprise using the multi-layer computing environment or due to the expiration of a contract, for example. As such, even if stale accounts for these suspended users continue to exist in the ADs (e.g., 106 of FIG. 1) after the user has departed, the user database 214 will maintain an accurate list of active users, and the authentication server 102 will prevent the authentication of suspended user accounts.

2.3 Computer System with Multi-Layer Network Topology

Figure 3:
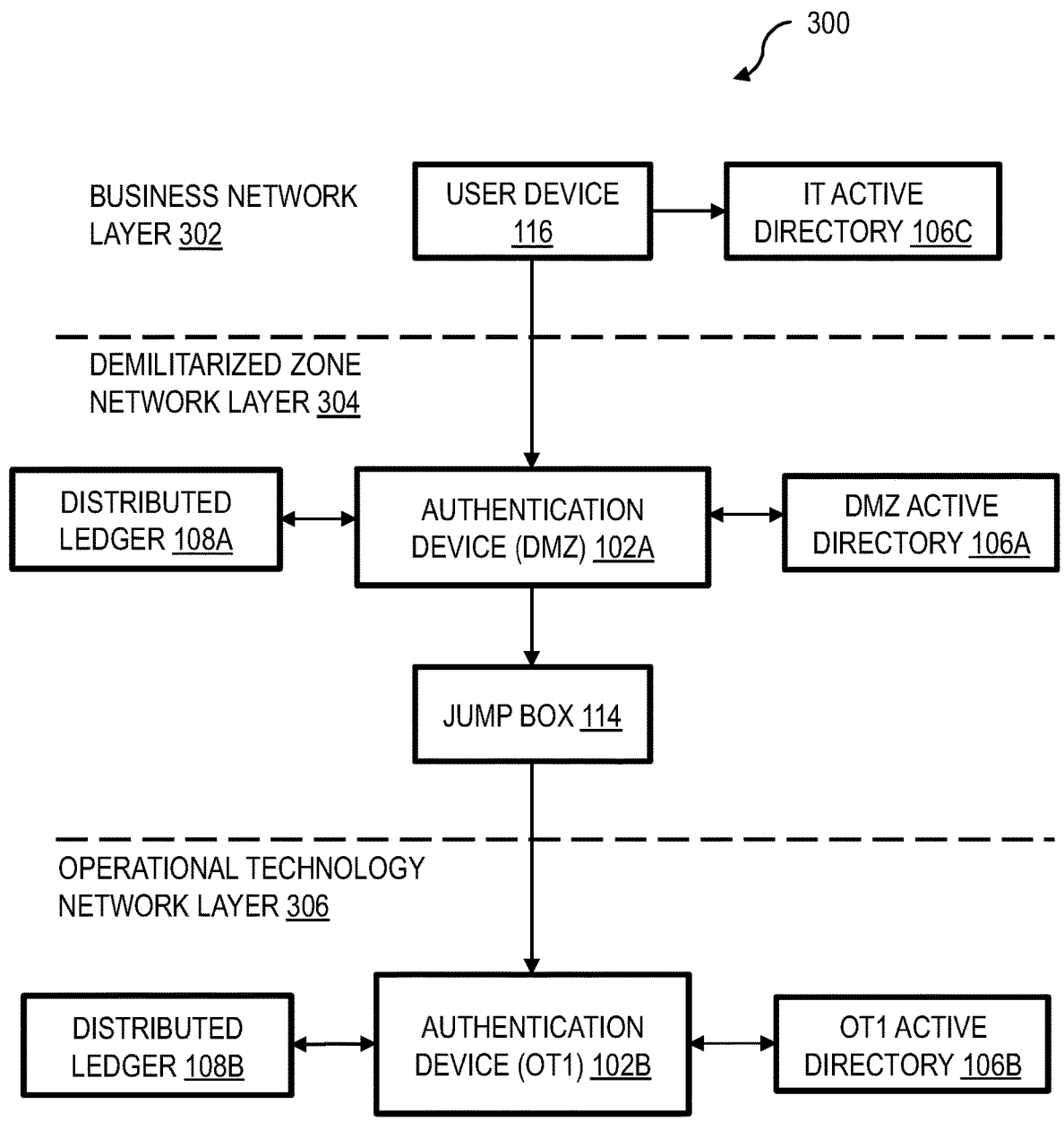
FIG. 3 shows an example computing environment having a multi-layer network topology in accordance with one or more embodiments.

FIG. 3 illustrates an example computing environment 300 in accordance with an embodiment. As illustrated, the computing environment 300 may have a multi-layer network topology. For example, the computing environment 300 may include three network layers or zones, including a business (e.g., IT) network layer 302, a demilitarized zone (DMZ) network layer 304, and an operational technology (OT) network layer 306. The OT network layer 306 may be accessible from the DMZ network layer 304 through jump box 114. The DMZ network layer 304 and the OT network layer 306 may each comprise an authentication device 102A, 102B, respectively, for authenticating a user 116 to access one or more resources in the different network layers 304 and 306. Each authentication device 102A, 102B may be an authentication server (e.g., 102 of FIG. 2) as described above or any other computing device capable of performing authentication of a user 116 to access one or more resources in the corresponding network layer. As illustrated, each of the IT network layer 302, the DMZ network layer 304, and the OT network layer 306 may have directory services. For example, the IT network layer 302, the DMZ network layer 304, and the OT network layer 306 may have active directories 106C, 106A, and 106B, respectively, located therein. In other embodiments, one or more network layers of the computing environment 300 may not have dedicated directory services.

In an embodiment, as illustrated, the business network layer 302 may not have an authentication device (e.g., 102) located therein for authenticating a user account of user 116 to access the IT active directory 106C. For example, the IT active directory 106C may include non-sensitive data for which further authentication is not required. In other embodiments, the IT network layer 302 may include an authentication device (e.g., 102) as well to authenticate a user account to access a directory or other sensitive data in the IT network layer 302.

Although only one authentication device 102A, 102B is shown in each of the network layers 304 and 306, it should be noted that multiple authentication devices (e.g., 102) may be present in any one of the network layers 302, 304, 306 for authenticating the user 116 to access multiple data resources or groups of data resources located in the network layer. Each authentication device (e.g., 102A, 102B) may function similarly to the authentication server 102 described above with reference to FIGS. 1 and 2.

The DMZ network layer 304 may include at least one authentication device 102A that physically and logically separates the DMZ network layer 304 from the IT network layer 302. Similarly, the OT network layer 306 may include at least one authentication device 102B that physically and logically separates the OT network layer 306 from the DMZ layer 304. The OT network layer 306 may include one or more operational devices (e.g., power systems 112 of FIG. 1). The "operational devices" may be any element or group of elements of operational technology systems, industrial control systems, or operational technology assets as described above with reference to the power systems 112 of FIG. 1.

The "user device" 116 may be a separate computing device from the authentication device(s) 102A, 102B. When a user desires to access one or more sensitive resources, the user may provide inputs into a browser form on the user device 116. These inputs may generally include a username and a TOTP. The TOTP may be communicated via text message, email, or an authenticator application on the user device 116 or a separate computing device that is accessible via biometric and/or PIN-based authentication. The authentication device(s) 102A, 102B may be compatible with any available TOTP services to provide multi-factor authentication to confirm user accounts.

As an example, to access one or more sensitive resources in the DMZ network layer 304, the user device 116 may send a request to the authentication device 102A with identity information corresponding to user inputs received at the user device 116. These user inputs may include a TOTP to access one or more resources within the DMZ network layer 304. The one or more resources for which access is requested may include the DMZ AD 106A, the jump box 114, or both, among other resources not shown in the drawing. The authentication device 102A may validate the TOTP, thereby authenticating the identity information of the user account submitted in the request. The authentication device 102A may then unveil the user password from multiple shares of pre-configured hidden data from the distributed ledger (not shown) in the DMZ network layer 304, thus authenticating the user device 116 to access the one or more resources in the DMZ network layer 304. As such, the authentication device 102A may provide authentication on behalf of the user to the directory services (e.g., AD 106A) and/or jump box 114 in the DMZ network layer 304.

The authentication device 102A may use the Shamir's secret sharing method and consensus across multiple nodes (e.g., 3-4 nodes) to determine the password used to authenticate the user device 116. This process of unveiling the password may be performed entirely within the DMZ network layer 304, and not at the IT network layer 302. The user device 116 does not input the password to the authentication device 102A and, as such, the password does not travel across the wire (i.e., from the user device 116) to the DMZ network layer 304. Instead, the user device 116 merely inputs identity information such as a username and TOTP across the wire. The user device 116 may not receive the password that is unveiled by the authentication device 102A. In an embodiment, the authentication device 102A resets the password for the user account after each authentication attempt.

The authentication device 102B in the OT network layer 306 may perform a similar authentication process in response to a request from the user device. The authentication device 102A may authenticate the user device 116 to the jump box 114, and the jump box 114 allows the user device 116 to communicate with the next layer down (e.g., OT network layer 306) from the DMZ network layer 304.

To access one or more sensitive resources in the OT network layer 306, the same user device 116 may send a second request to the authentication device 102B in the OT network layer 306 (using the jump box 114) with identity information corresponding to user inputs received at the user device 116. These user inputs may include a second username and a second TOTP to access one or more resources within the OT network layer 306. The one or more resources for which access is requested may include the OT AD 106B, another jump box (not shown), and/or other resources in the OT network layer 306. The authentication device 102B may validate the second TOTP, thereby authenticating the identity information of the user account submitted in the new request. The authentication device 102B may then unveil a second password from multiple shares of pre-configured hidden data from a distributed ledger (not shown) in the OT network layer 306, thus authenticating the user device 116 to access the one or more resources in the OT network layer 306. As such, the authentication device 102B may provide authentication on behalf of the user to the directory services (e.g., AD 106B) in the OT network layer 306.

The authentication device 102B may use Shamir's secret sharing and consensus across multiple nodes (e.g., 3-4 nodes) to determine the second password used to authenticate the user device 116. This process of unveiling the second password may be performed entirely within the OT network layer 306, and not at the IT network layer 302 or DMZ network layer 304. The user device 116 does not input the password to the authentication device 102B and, as such, the password does not travel across the wire (i.e., from the user device 116) to the OT network layer 306. Instead, the user device 116 merely inputs identity information such as a second username and second TOTP across the wire. The user device 116 may not receive the second password that is determined by the authentication device 102B. In an embodiment, the authentication device 102B resets the second password for the second user account after each authentication attempt.

Since the only information that is traveling from the user device 116 to the authentication device(s) 102A/B is a username and TOTP, and the TOTP changes with time, the risk of a replay attack is greatly reduced or eliminated. In addition, if an attacker manages to penetrate one network layer, they cannot access the other network layers since additional authentication is required and performed separately in each layer.

Using passwordless authentication at each network layer makes the process of managing several user accounts simpler for a human user. As long as the human user (or user device 116) knows the usernames for accessing each network layer and has access to a computing device that is configured to receive TOTPs for the user accounts, then there is no need to keep track of multiple passwords for accessing different network layers. This provides increased security of resources in the computing environment 300 by using multi-layer authentication and preventing users from assigning similar or the same passwords to multiple accounts while reducing complexity for human users to access sensitive resources.

3. Procedural Overview

Figure 4:
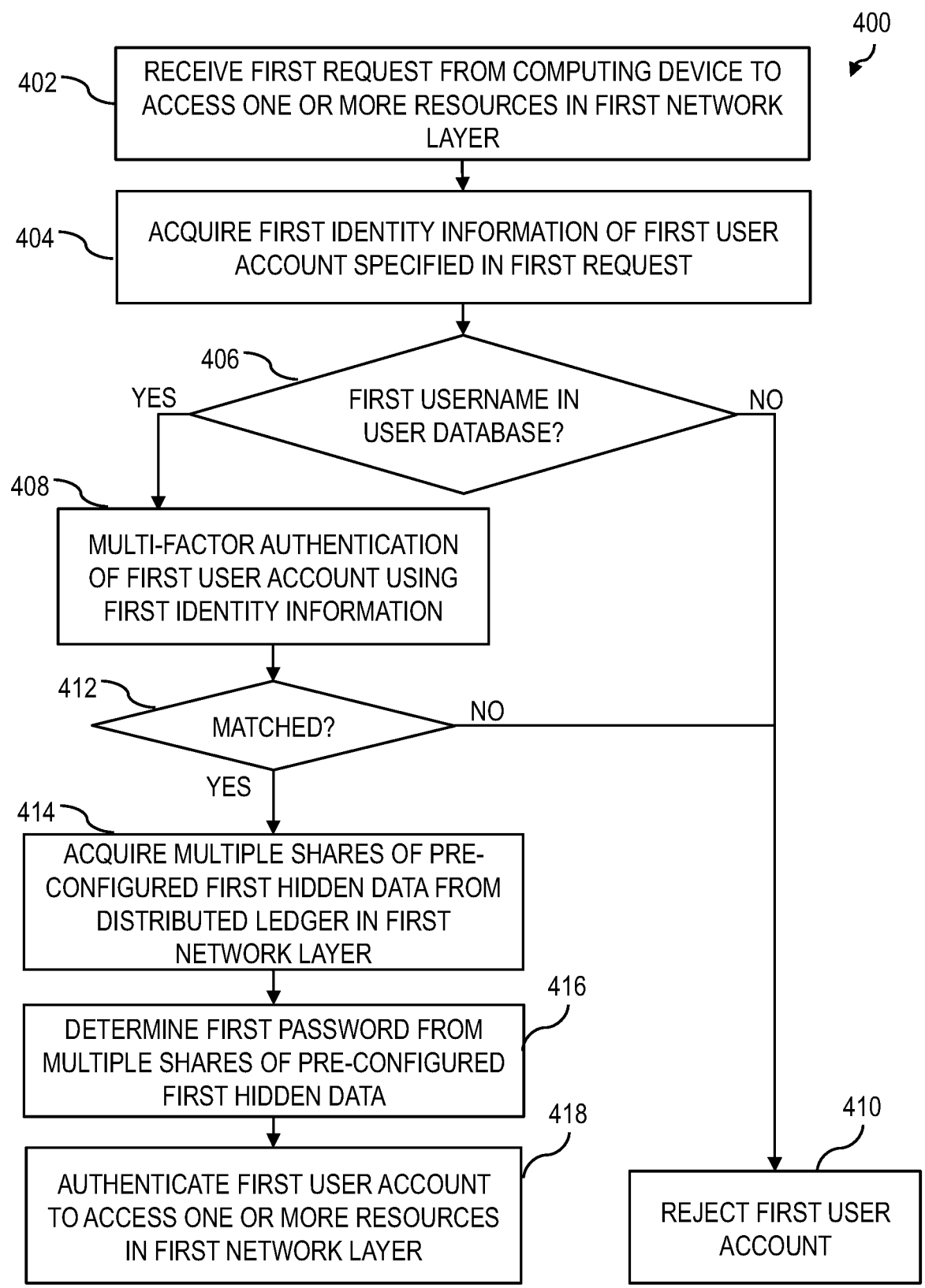
FIG. 4 shows a flow chart of a method of authenticating a user account to access one or more resources in a first network layer in accordance with one or more embodiments.
Figure 5:
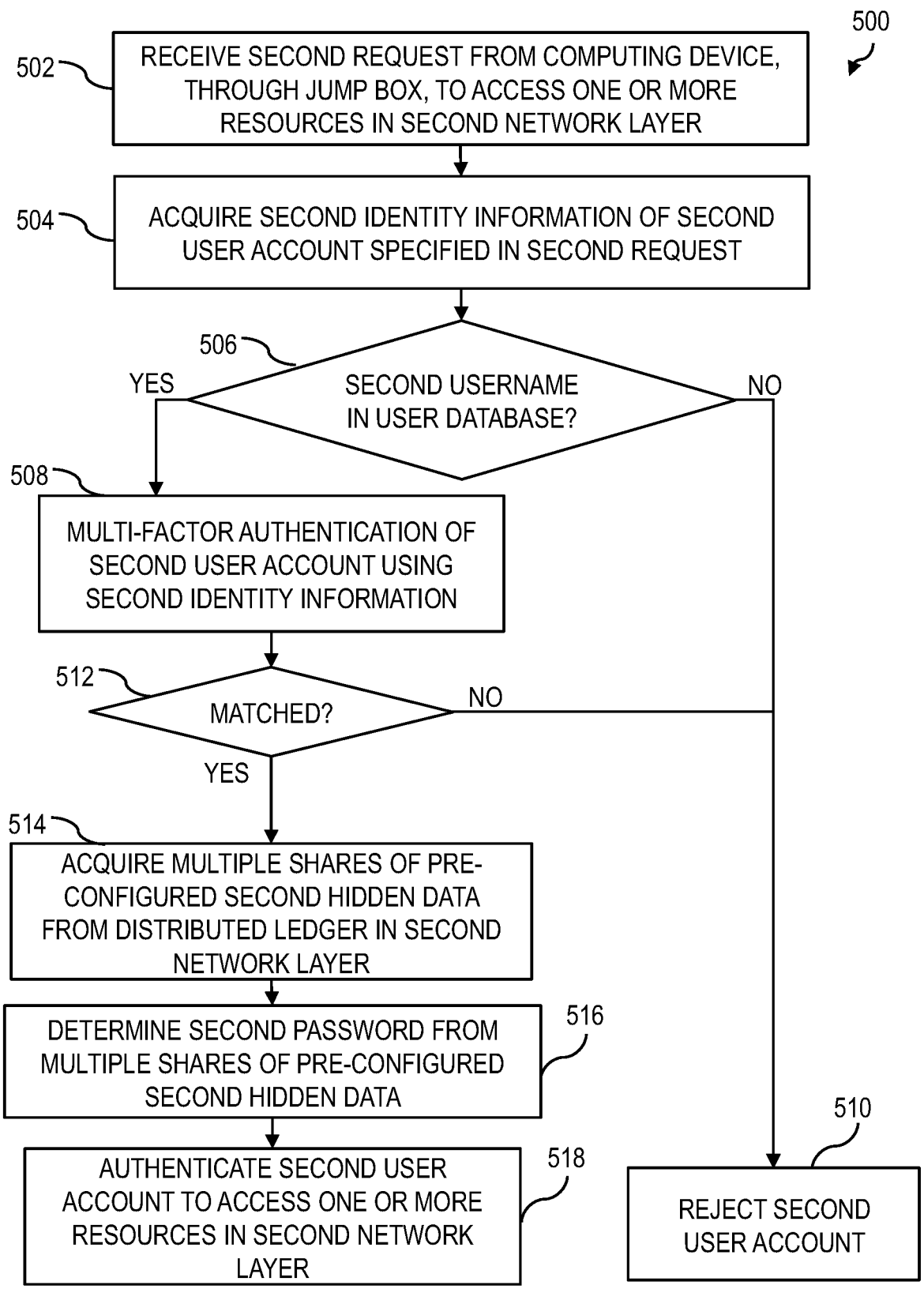
FIG. 5 shows a flow chart of a method of authenticating a user account to access one or more resources in a second network layer in accordance with one or more embodiments.
Figure 6:
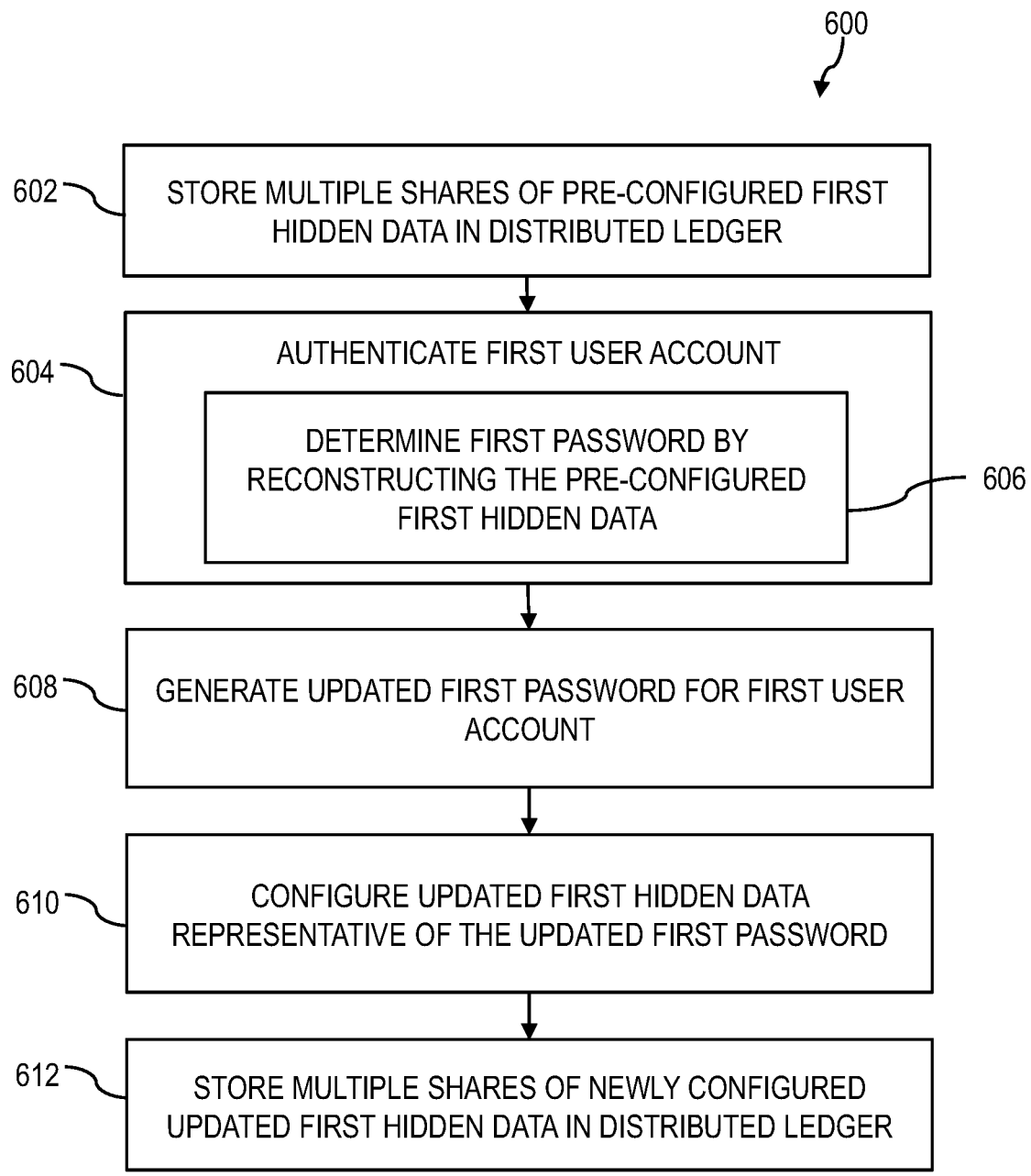
FIG. 6 shows a flow chart of a method of changing a user password after an authentication attempt in accordance with one or more embodiments.

FIG. 4 illustrates a method of performing user authentication when a user attempts to access a sensitive data resource in a first network layer in accordance with one or more embodiments. Each of FIG. 4, FIG. 5, and FIG. 6 illustrates examples of a computer-implemented method, algorithm, or process that can be programmed. FIG. 4 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In the example of FIG. 4, a method 400 may be used to apply a multi-layer multi-factor authentication to access the sensitive data resource. One or more blocks in FIG. 4 may be performed by one or more computing devices logically located within a first network layer (e.g., DMZ network layer 304 of FIG. 3) of a computing environment having a multi-layer topology. For example, the authentication server 102 of FIGS. 1 and 2 and/or the authentication device 102A of FIG. 3 can be programmed, using one or more sequences of instructions, to execute the operations of FIG. 4. While the various blocks in FIG. 4 are presented and described sequentially, some or all of the blocks may be executed in different orders, may be combined or omitted, and some or all of the blocks may be executed in parallel. Furthermore, the blocks may be performed actively or passively.

In block 402, the method 400 includes receiving a first request from a second computing device (e.g., user device 116 of FIG. 3) to access one or more resources in the first network layer. The one or more resources in the first network layer may include a first active directory server (e.g., AD 106A of FIG. 3). The first request may include first identity information of a first user account and information regarding the one or more resources to which access is being requested. The first identity information may include a first username and a TOTP. In block 404, the method 400 includes acquiring the first identity information of the first user account specified in the first request.

In an embodiment, performing a multi-factor authentication of the first user account may include accessing a user database to determine whether the first user account is active. For example, in block 406 the method 400 may include determining whether the first username is active in a user database (e.g., 214 of FIG. 2). If the one or more computing devices determine that the first username is active in the user database, the method 400 proceeds to block 408. If the one or more computing devices determine that the first username is suspended in the user database, the method 400 proceeds to block 410, rejecting the first user account.

In block 408, the method 400 may include performing a multi-factor authentication of the first user account using the first identity information. For example, one or more computing devices may perform the multi-factor authentication of the first user account based on the TOTP received with the first request. If at block 412 the one or more computing devices determines that the first identity information (e.g., particularly the TOTP) matches an expected identity information for the first user account, the method 400 proceeds to block 414. If the first identity information (e.g., TOTP) does not match the expected identity information for the first user account, the method 400 proceeds to block 410, rejecting the first user account.

Upon authenticating the first user account using the first identity information, in block 414 the method 400 includes acquiring multiple shares of pre-configured first hidden data from a distributed ledger (e.g., 108A of FIG. 3) in the first network layer. In block 416, the method 400 includes determining a first password from the multiple shares of pre-configured first hidden data. In block 418, the method 400 includes using the first password to authenticate the first user account to access the one or more resources in the first network layer. In an embodiment, block 418 may include authenticating the first user account to access the one or more resources in the first network layer based on the first username and the first password.

In an embodiment, the authentication server (e.g., 102 of FIGS. 1 and 2) and/or authentication device (e.g., 102A of FIG. 3) in the first network layer is programmed to execute the operations of method 400 whenever a request from a user account crosses into a functional element of the first network layer (e.g., 304 of FIG. 3).

FIG. 5 illustrates a method of performing user authentication when a user attempts to access a sensitive data resource in a second network layer (e.g., one network layer down from the first network layer of FIG. 4) in accordance with one or more embodiments. The example method 500 of FIG. 5 may be used following method 400 of FIG. 4 to apply a multi-layer multi-factor authentication to access the sensitive data resource in the second network layer. For example, one or more resources in the first network layer (e.g., 304 of FIG. 3) may include a jump box (e.g., 114 of FIG. 3) that is communicatively coupled to the second network layer (e.g., 306 of FIG. 3) of the computing environment. The jump box may be used to communicate a second request to one or more computing devices in the second network layer, the second request being to access the sensitive resource(s) of the second network layer.

One or more blocks in FIG. 5 may be performed by one or more computing devices logically located within the second network layer (e.g., OT network layer 306 of FIG. 3) of the computing environment. For example, the authentication server 102 of FIG. 2 and/or the authentication device 102B of FIG. 3 can be programmed, using one or more sequences of instructions, to execute the operations of FIG. 5. While the various blocks in FIG. 5 are presented and described sequentially, some or all of the blocks may be executed in different orders, may be combined or omitted, and some or all of the blocks may be executed in parallel. Furthermore, the blocks may be performed actively or passively.

In block 502, the method 500 includes receiving a second request from the second computing device (e.g., user device 116 of FIG. 3), which is the same as the second computing device that made the first request in FIG. 4, to access one or more resources in the second network layer. The one or more resources in the second network layer may include a second active directory server (e.g., AD 106B of FIG. 3). The second request may include second identity information of a second user account and information regarding the one or more resources to which access is being requested. The second identity information may include a second username and another TOTP (i.e., different from the TOTP used in FIG. 4). This other TOTP may be used to authenticate the second user account, which is different from the first user account but corresponds to the same user device. In block 504, the method 500 includes acquiring the second identity information of the second user account specified in the second request.

In an embodiment, performing a multi-factor authentication of the second user account may include accessing a user database to determine whether the second user account is active. For example, in block 506 the method 500 may include determining whether the second username is active in the user database (e.g., 214 of FIG. 2). If the one or more computing devices determine that the second username is active in the user database, the method 500 proceeds to block 508. If the one or more computing devices determine that the second username is suspended in the user database, the method 500 proceeds to block 510, rejecting the second user account.

In block 508, the method 500 may include performing a multi-factor authentication of the second user account using the second identity information. For example, one or more computing devices may perform the multi-factor authentication of the second user account based on the TOTP received with the second request. If at block 512 the one or more computing devices determines that the first identity information (e.g., particularly the TOTP) matches an expected identity information for the second user account, the method 500 proceeds to block 514. If the second identity information (e.g., TOTP) does not match the expected identity information for the second user account, the method 500 proceeds to block 510, rejecting the second user account.

Upon authenticating the second user account using the second identity information, in block 514 the method 500 includes acquiring multiple shares of pre-configured second hidden data from a distributed ledger (e.g., 108B of FIG. 3) in the second network layer. In block 516, the method 500 includes determining a second password from the multiple shares of pre-configured second hidden data. In block 518, the method 500 includes using the second password to authenticate the second user account to access the one or more resources in the second network layer. In an embodiment, block 518 may include authenticating the second user account to access the one or more resources in the second network layer based on the second username and the second password.

In an embodiment, the authentication server (e.g., 102 of FIGS. 1 and 2) and/or authentication device (e.g., 102B of FIG. 3) in the second network layer is programmed to execute the operations of method 500 whenever a request from a user account crosses into a functional element of the second network layer (e.g., 306 of FIG. 3).

Similar authentication processes to those described above with reference to FIGS. 4 and 5 may be used to authenticate a user account for access to resources in any number of additional network layers beyond the first network layer (e.g., 304 of FIG. 3) and the second network layer (e.g., 306 of FIG. 3). For example, the authentication server (e.g., 102 of FIGS. 1 and 2) and/or one or more additional authentication devices in each network layer may be programmed to execute similar operations as in methods 400 and 500 whenever a request crosses into a functional element of a particular logical network layer or zone of the multi-layer computing environment.

FIG. 6 illustrates a method 600 of changing a user password after an authentication attempt in accordance with one or more embodiments. The method 600 may be used to reset the password used to authenticate a given user account in a given network layer of the computing environment after an authentication attempt. In an embodiment, the method 600 may be performed after each successful attempt at authenticating the corresponding user account for accessing one or more resources in a particular network layer. The method 600 may also be performed after each unsuccessful attempt at authenticating the corresponding user account.

One or more blocks in FIG. 6 may be performed by one or more computing devices logically located within a first network layer (e.g., DMZ network layer 304 of FIG. 3) of a computing environment having a multi-layer topology. For example, the authentication server 102 of FIGS. 1 and 2 and/or the authentication device 102A of FIG. 3 can be programmed, using one or more sequences of instructions, to execute the operations of FIG. 6. While the various blocks in FIG. 6 are presented and described sequentially, some or all of the blocks may be executed in different orders, may be combined or omitted, and some or all of the blocks may be executed in parallel. Furthermore, the blocks may be performed actively or passively.

In block 602, the method 600 includes storing multiple shares of pre-configured first hidden data in a distributed ledger (e.g., 108A of FIG. 3). This may involve computationally securing the pre-configured first hidden data in the distributed ledger by executing a Shamir's secret sharing algorithm. Other algorithms or methods may be used to divide a password into multiple shares of data to be hidden among various nodes in a distributed ledger.

In block 604, the method 600 includes authenticating a first user account. Block 604 may include one or more operations of the method 400 in FIG. 4 as described above. In an embodiment, as shown in block 606, the authentication (604) may involve determining the first password by reconstructing the pre-configured first hidden data. For example, block 606 may include determining the first password by reconstructing the pre-configured first hidden data from a threshold number of shares from among the multiple shares (e.g., using the Shamir's secret sharing algorithm). Block 604 may include authenticating the first user account to access one or more resources in the first network layer based on the first password.

In response to authenticating the first user account, in block 608, the method 600 may include generating an updated first password for the first user account. The one or more computing devices performing the steps of method 600 may not communicate the new password to a user device (e.g., 116 of FIG. 3). In block 610, the method 600 may include configuring updated first hidden data representative of the updated first password. In block 612, the method 600 may include storing multiple shares of the newly configured updated first hidden data in the distributed ledger (e.g., 108A of FIG. 3) in the first network layer. This may involve a similar computational process as block 602, such as securing the pre-configured first hidden data in the distributed ledger by executing a Shamir's secret sharing algorithm or some other algorithm.

A similar method as the method 600 of FIG. 6 may be performed by one or more computing devices (e.g., authentication device 102B) logically located within a second network layer (e.g., OT network layer 306 of FIG. 3, or any other desired network layer) of a computing environment to change a user password after an authentication attempt.

4. Implementation Example

Figure 7A:
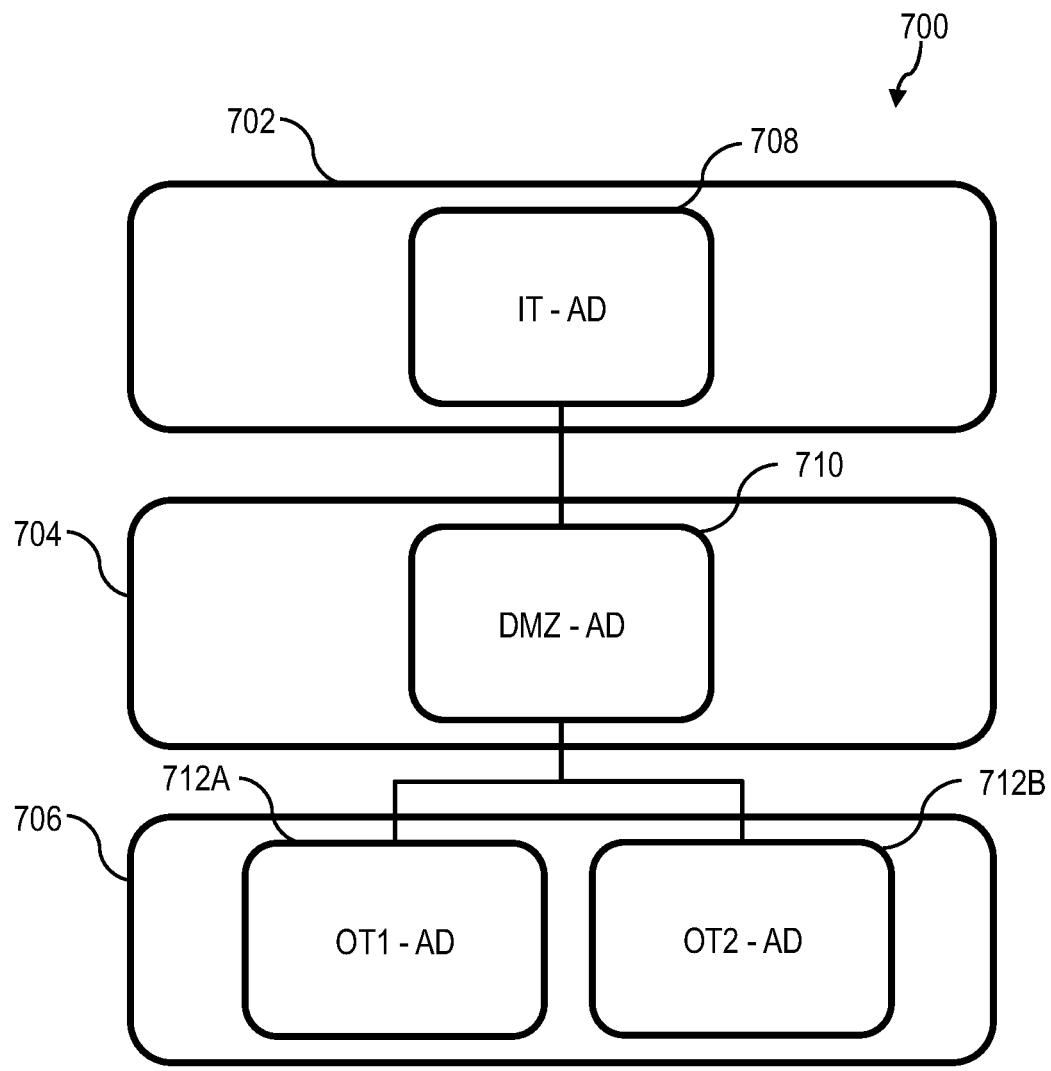
FIG. 7A shows an example of an operational technology topology in accordance with one or more embodiments.

FIG. 7A shows an example of an operational technology topology 700 in one embodiment. The enterprise server can use a multi-layer cybersecurity model to map different security zones to corresponding operational technology assets and/or devices within the operational technology network. For example, the authentication server (e.g., 102 of FIGS. 1 and 2) can map the corresponding operational technology assets and/or devices to different layers of defense in the multi-layer cybersecurity model, such as a first layer 702 (e.g., IT network layer 302 of FIG. 3), a second layer 704 (e.g., DMZ network layer 304 of FIG. 3), and a third layer 706 (e.g., OT network layer 306 of FIG. 3). The number of layers and zones shown in FIG. 7A represent only one example; in other embodiments, the third layer 706 can comprise many other layers and zones. Furthermore, the public internet, cloud computing centers or services, and/or one or more cloud computing instances, storage instances, and/or applications can be present in a cloud layer logically located at Layer 5 above the first layer 702.

Each layer of FIG. 7A can comprise one or more Active Directory (AD) servers and/or other directory servers that are configured or programmed to provide authentication services. An enterprise server also can include one or more AD servers to manage a plurality of operational technology assets and/or devices within the third layer 706. Each of the layers of defense can be mapped to one or more AD servers to mirror a typical operational technology network topology. In particular, the first layer 702 can be mapped to a plurality of first AD servers in one or more IT zones 708, the second layer 704 can be mapped to a plurality of second AD servers in one or more demilitarized zones (DMZ) 710, and the third layer 706 can be mapped to a plurality of third AD servers in one or more OT zones 712. The operational technology network topology can be determined based on the configuration of the AD servers associated with the enterprise. For example, the third layer 706 can include two groups of AD servers associated with different operational technology zones 712A and 712B, such as PLCs, distributed control systems, computer control systems, energy monitoring systems, safety systems, and transportation systems.

Figure 7B:
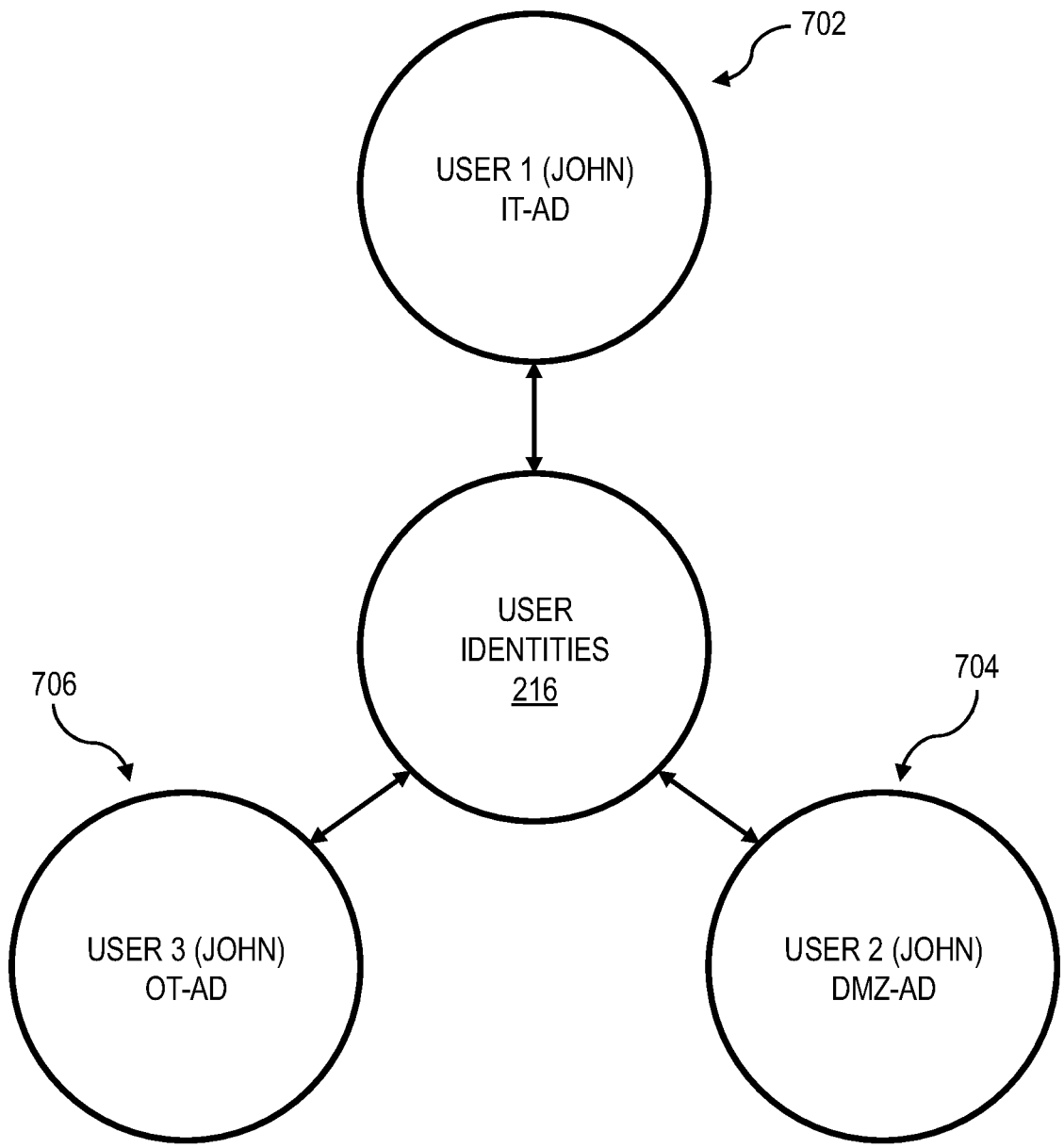
FIG. 7B shows an example of a user identity mapping in accordance with one or more embodiments.

In an embodiment, the authentication server (e.g., 102 of FIG. 1 and FIG. 2) is programmed to execute the operations of method 400 (e.g., of FIG. 4), or similarly the operations of method 500 (e.g., of FIG. 5), whenever a request is received at a functional element of the second layer 704, the third layer 706, or any of the zones 712 of the third layer. Furthermore, the authentication server (e.g., 102 of FIGS. 1 and 2) is programmed to execute authentication operations for all user identities of a user, against one or more of the AD servers and/or Xage nodes. FIG. 7B shows an example of a user identity mapping in accordance with one or more embodiments. The authentication server (e.g., 102 of FIGS. 1 and 2) can use a multi-layer cybersecurity model to manage multiple user identities for the same user across multiple AD servers to grant that user access to different security zones and corresponding operational technology assets and/or devices within the operational technology network. For example, a user (e.g., 116 of FIG. 1) can have different user identities in different security zones, such as "user 1" in the first layer 702, "user 2" in the second layer 704, and "user 3" in the third layer 706. The authentication server can map these different user identities associated with the same user to user identities (e.g., 216 of FIG. 2) in the user database (e.g., 214 of FIG. 2) based on user accounts data associated with the user.

Embodiments programmed according to the foregoing process and architecture provide multiple user accounts for a given computer or human user and enable passwordless authentication of these multiple user accounts. The disclosed process and architecture use multi-factor authentication to allow user accounts to traverse multiple network layers without a human user having to remember passwords and without the computing system(s) receiving any password across the wire. In addition, the disclosed processes and architecture allow user accounts to traverse multiple layers without re-authentication at each network layer. Once a user account is authenticated using passwordless authentication in a first network layer, the method allows the user account to send a request to access resources in a second network layer seamlessly without re-authenticating the request at the first network layer.

5. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
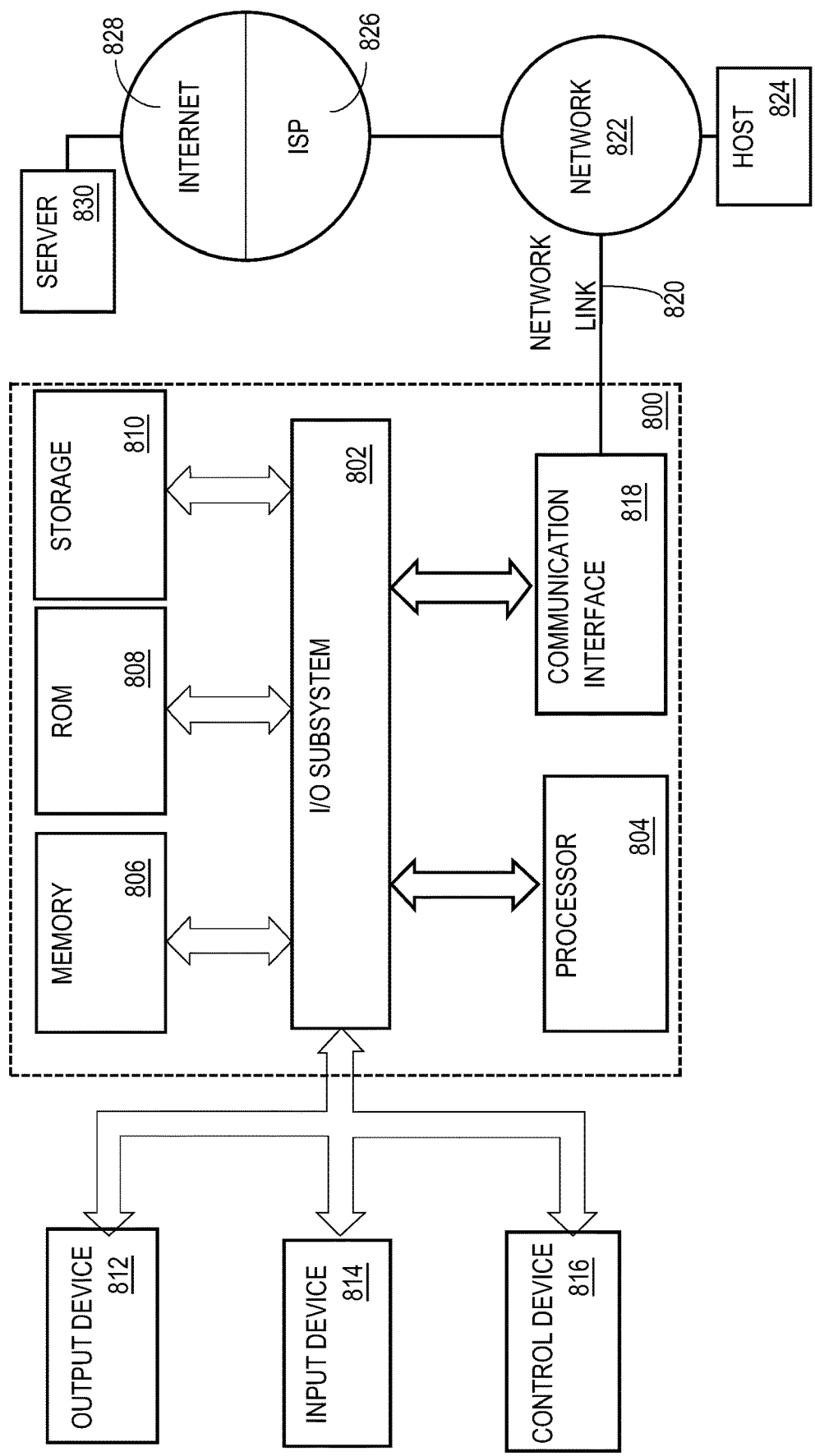
FIG. 8 illustrates a computer system in accordance with one or more embodiments.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802, which may include a bus and/or other communication mechanism(s) for communicating information and/or instructions between the components of the computer system 800 over electronic signal paths. The I/O subsystem 802 may include an I/O controller, a memory controller, and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU), or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during the execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read-only memory (ROM) 808 or other static storage devices coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, solid-state storage, magnetic disk, or optical disks such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808, or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 800 may be coupled via I/O subsystem 802 to at least one output device 812. In one embodiment, output device 812 is a digital computer display. Examples of a display that may be used in various embodiments include a touchscreen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections, or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. The control device 816 may be a touchpad, a mouse, a trackball, or cursor direction keys for communicating direction information and command selections to processor 804 and for controlling cursor movement on an output device 812 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 814 may include a combination of multiple different input devices, such as a video camera and a depth sensor.

In another embodiment, computer system 800 may comprise an Internet of Things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders, and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware, and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 802. Transmission media can also take the form of acoustic or light waves, such as those generated during radio-wave and infrared data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as placing the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to I/O subsystem 802. Communication interface 818 provides a two-way data communication coupling to a network link(s) 820 that are directly or indirectly connected to at least one communication network, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a worldwide packet data communication network represented as Internet 828. A server computer 830 may be coupled to Internet 828. Server computer 830 broadly represents any computer, data center, virtual machine, or virtual computing instance with or without a hypervisor or computer executing a containerized program system such as DOCKER or KUBERNETES. Server computer 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, a server farm, or other organizations of computers that cooperate to perform tasks or execute applications or services. Server computer 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer, and data storage layer such as a relational database system using a structured query language (SQL) or no SQL, an object store, a graph database, a flat file system or other data storage.

Computer system 800 can send messages and receive data and instructions, including program code, through the network(s), network link 820, and communication interface 818. In the Internet example, server computer 830 might transmit a requested code for an application program through Internet 828, ISP 826, local network 822, and communication interface 818. The received code may be executed by processor 804 as it is received, and/or stored in storage 810, or other non-volatile storage for later execution.

The execution of instructions as described in this section may implement a process in the form of an instance of a computer program that is being executed, consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using one or more first computing devices logically located within a first network layer of a computing environment having a multi-layer topology, the method comprising:
   receiving a first request from a second computing device to access one or more resources in the first network layer;
   acquiring first identity information of a first user account specified in the first request;
   performing multi-factor authentication of the first user account using the first identity information;
   in response to authenticating the first user account using the first identity information, acquiring multiple shares of pre-configured first hidden data from a distributed ledger in the first network layer;
   determining a first password from the multiple shares of pre-configured first hidden data;
   using the first password, authenticating the first user account to access the one or more resources in the first network layer.

2. The computer-implemented method of claim 1, wherein the one or more resources in the first network layer comprise a first active directory server.

3. The computer-implemented method of claim 1, further comprising executing the multi-factor authentication based on a time-based one-time password communicated via text message, email, or an authenticator application on the second computing device or another computing device accessible via biometric and/or PIN-based authentication.

4. The computer-implemented method of claim 1, further comprising:
   computationally securing the pre-configured first hidden data in the distributed ledger by executing a Shamir's secret sharing algorithm;
   determining the first password by reconstructing the pre-configured first hidden data from a threshold number of shares from among the multiple shares.

5. The computer-implemented method of claim 1, the one or more resources in the first network layer comprising a jump box that is communicatively coupled to a second network layer of the computing environment, the method further comprising one or more third computing devices in the second network layer executing:
   receiving a second request from the second computing device to access one or more resources in the second network layer;
   acquiring second identity information of a second user account specified in the second request;
   performing multi-factor authentication of the second user account using the second identity information;
   in response to authenticating the second user account using the second identity information, acquiring multiple shares of pre-configured second hidden data from a distributed ledger in the second network layer;
   determining a second password from the multiple shares of pre-configured second hidden data;
   using the second password, authenticating the second user account to access the one or more resources in the second network layer.

6. The computer-implemented method of claim 5, wherein the one or more resources in the second network layer comprise a second active directory server.

7. The computer-implemented method of claim 5, wherein the first identity information comprises a first username and a time-based one-time password, and the second identity information comprises a second username and a different time-based one-time password.

8. The computer-implemented method of claim 7, further comprising:
   authenticating the first user account to access the one or more resources in the first network layer based on the first username and the first password;
   authenticating the second user account to access the one or more resources in the second network layer based on the second username and the second password.

9. The computer-implemented method of claim 7, further comprising performing the multi-factor authentication of the first user account by accessing a user database to determine whether the first username is active in the user database, and in response to determining that the first username is active in the user database, performing the multi-factor authentication of the first user account based on the time-based one-time password.

10. The computer-implemented method of claim 9, further comprising, in response to determining the first username is suspended in the user database, rejecting the first user account.

11. The computer-implemented method of claim 9, further comprising performing the multi-factor authentication of the second user account by accessing the user database to determine whether the second username is active in the user database, and in response to determining that the second username is active in the user database, performing the multi-factor authentication of the second user account based on the different time-based one-time password.

12. The computer-implemented method of claim 11, further comprising:
receiving a request to suspend user accounts associated with particular user identity data from accessing resources of the computing environment;
in response to the request, updating the user database to suspend all usernames associated with the user accounts, including the first username and the second username, from the user database.

13. The computer-implemented method of claim 11, further comprising:
receiving a request to register a new user account to access resources of the computing environment;
in response to the request, updating the user database to register one or more usernames associated with the new user account in the user database.

14. The computer-implemented method of claim 5, wherein the first network layer is a demilitarized zone (DMZ) layer comprising at least one authentication device that physically and logically separates the first network layer from a third network layer, and the second network layer is an operational technology zone comprising one or more operational devices.

15. The computer-implemented method of claim 1, further comprising, in response to authenticating the first user account to access the one or more resources in the first network layer based on the first password:
generating an updated first password for the first user account;
configuring updated first hidden data representative of the updated first password; and
storing multiple shares of the updated first hidden data in the distributed ledger in the first network layer.

16. The computer-implemented method of claim 1, further comprising:
accessing, by a management networking device in the first network layer, identity awareness data for user accounts that are authorized to access an active directory of the first network layer, the identity awareness data for each user account comprising a user account and a password;
determining a new user account is present in the identity awareness data;
acquiring the identity awareness data for the new user account;
configuring new hidden data representative of the password for the new user account; and
storing multiple shares of the new hidden data in the distributed ledger in the first network layer.

17. A computer system, comprising:
one or more processors;
one or more computer-readable non-transitory storage media coupled to the one or more processors and comprising instructions operable when executed by the one or more processors to cause the system to execute, by one or more first computing devices logically located within a first network layer of a computing environment having a multi-layer topology:
receiving a first request from a second computing device to access one or more resources in the first network layer;
acquiring first identity information of a first user account specified in the first request;
performing multi-factor authentication of the first user account using the first identity information;
in response to authenticating the first user account using the first identity information, acquiring multiple shares of pre-configured first hidden data from a distributed ledger in the first network layer;
determining a first password from the multiple shares of pre-configured first hidden data;
using the first password, authenticating the first user account to access the one or more resources in the first network layer.

18. The computer system of claim 17, wherein the instructions are further operable when executed by the one or more processors to cause the computer system to execute the multi-factor authentication based on a time-based one-time password communicated via text message, email, or an authenticator application on the second computing device accessible via biometric and/or PIN-based authentication.

19. The computer system of claim 17, the one or more resources in the first network layer comprising a jump box that is communicatively coupled to a second network layer of the computing environment, wherein the instructions are further operable when executed by the one or more processors to cause the system to execute, by one or more third computing devices in the second network layer:
receiving a second request from the second computing device to access one or more resources in a second network layer;
acquiring second identity information of a second user account specified in the second request;
performing multi-factor authentication of the second user account using the second identity information;
in response to authenticating the second user account using the second identity information, acquiring multiple shares of pre-configured second hidden data from a distributed ledger in the second network layer;
determining a second password from the multiple shares of pre-configured second hidden data;
using the second password, authenticating the second user account to access the one or more resources in the second network layer.

20. The computer system of claim 17, wherein the instructions are further operable when executed by the one or more processors to cause the computer system to execute, in response to authenticating the first user account to access the one or more resources in the first network layer based on the first password:
generating an updated first password for the first user account;
configuring updated first hidden data representative of the updated first password;
storing multiple shares of the updated first hidden data in the distributed ledger in the first network layer.

21. One or more computer-readable non-transitory storage media storing one or more sequences of instructions which, when executed using one or more processors, cause the one or more processors to execute, using one or more first computing devices logically located within a first network layer of a computing environment having a multi-layer topology:
- receiving a first request from a second computing device to access one or more resources in the first network layer;
- acquiring first identity information of a first user account specified in the first request;
- performing multi-factor authentication of the first user account using the first identity information;
- in response to authenticating the first user account using the first identity information, acquiring multiple shares of pre-configured first hidden data from a distributed ledger in the first network layer;
- determining a first password from the multiple shares of pre-configured first hidden data;
- using the first password, authenticating the first user account to access the one or more resources in the first network layer.

22. The one or more computer-readable non-transitory storage media of claim 21, wherein the instructions are further operable when executed by the one or more processors to cause the one or more processors to execute the multi-factor authentication based on a time-based one-time password communicated via text message, email, or an authenticator application on the second computing device accessible via biometric and/or PIN-based authentication.

23. The one or more computer-readable non-transitory storage media of claim 21, the one or more resources in the first network layer comprising a jump box that is communicatively coupled to a second network layer of the computing environment, wherein the instructions are further operable when executed by the one or more processors to cause the one or more processors to execute, by one or more third computing devices in the second network layer:
- receiving a second request from the second computing device to access one or more resources in the second network layer;
- acquiring second identity information of a second user account specified in the second request;
- performing multi-factor authentication of the second user account using the second identity information;
- in response to authenticating the second user account using the second identity information, acquiring multiple shares of pre-configured second hidden data from a distributed ledger in the second network layer;
- determining a second password from the multiple shares of pre-configured second hidden data;
- using the second password, authenticating the second user account to access the one or more resources in the second network layer.

24. The one or more computer-readable non-transitory storage media of claim 21, wherein the instructions are further operable when executed by the one or more processors to cause the one or more processors to execute, in response to authenticating the first user account to access the one or more resources in the first network layer based on the first password:
- generating an updated first password for the first user account;
- configuring updated first hidden data representative of the updated first password; and
- storing multiple shares of the updated first hidden data in the distributed ledger in the first network layer.

* * * * *